P. MOJICO.
CONTROL VALVE.
APPLICATION FILED MAY 7, 1919. RENEWED AUG. 27, 1920.

1,358,232.

Patented Nov. 9, 1920.
2 SHEETS—SHEET 1.

INVENTOR
*PETER MOJICO.*
BY
*Frank Ledermann*
ATTORNEY

P. MOJICO.
CONTROL VALVE.
APPLICATION FILED MAY 7, 1919. RENEWED AUG. 27, 1920.
1,358,232.
Patented Nov. 9, 1920.
2 SHEETS—SHEET 2.
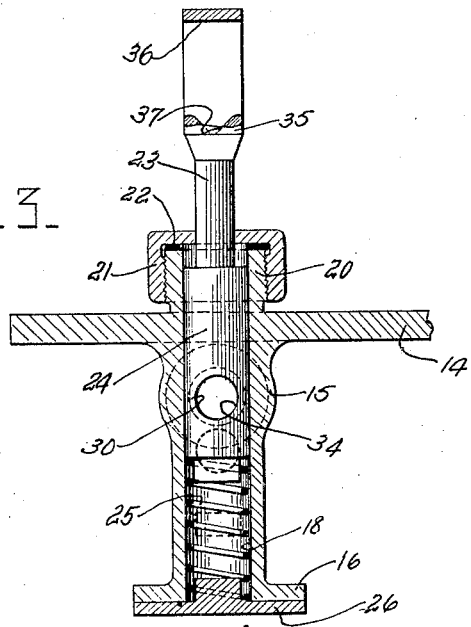
Fig. 3.
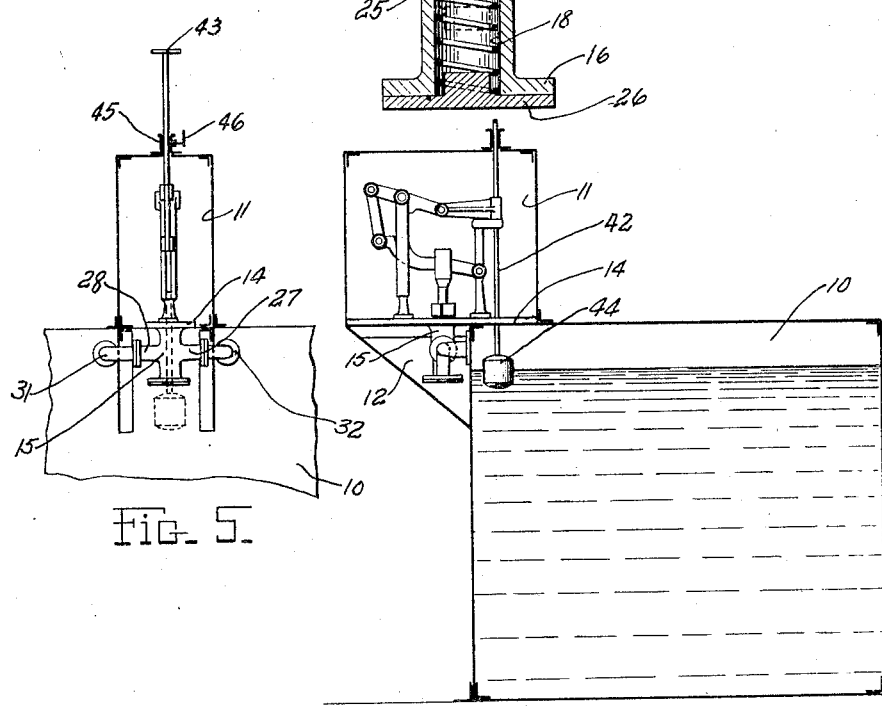
Fig. 5.
Fig. 4.
INVENTOR
PETER MOJICO
BY
Frank Lederman
ATTORNEY

UNITED STATES PATENT OFFICE.

PETER MOJICO, OF HAMTRAMCK, MICHIGAN.

CONTROL-VALVE.

1,358,232.                    Specification of Letters Patent.        Patented Nov. 9, 1920.

Application filed May 7, 1919, Serial No. 295,410. Renewed August 27, 1920. Serial No. 406,524.

*To all whom it may concern:*

Be it known that I, PETER MOJICO, a citizen of Russia, residing at Hamtramck, county of Wayne, and State of Michigan, have invented certain new and useful Improvements in Control-Valves, of which the following is a specification.

This invention relates to improvements in devices for controlling the flow of water to a tank or the like, and has as its special object the provision of a control valve in which a lever actuated plunger is operated by a float in a novel and effective manner.

This object is attained by the novel construction and combination of parts hereinafter described, and shown in the accompanying drawings, forming a material part of this disclosure, and in which—

Fig. 3 is enlarged vertical sectional view taken through the control valves.

Fig. 4 is a side elevational view indicating the application of the invention, and Fig. 5 is a front view of the same.

Figure 1:
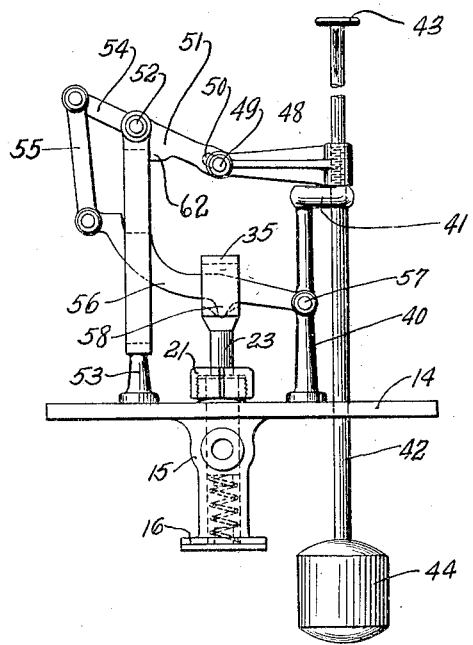
Figure 1 is a side elevational view of a control valve made in accordance with the invention, the valve being shown in an open position.
Figure 2:
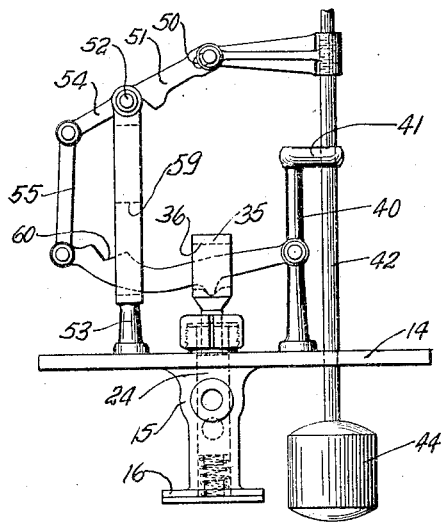
Fig. 2 is a similar view of the same, parts being in another position, showing the valve closed.

Referring to the drawings, the numeral 10 indicates a tank adapted to be filled with a fluid and having mounted thereon a casing 11, partly supported by brackets 12, the casing containing the mechanism for actuating the valve.

A platform 14 is formed with the valve body 15, the latter extending centrally downward, terminating in a flange 16 at its lower end, and containing a central, bored opening 18, extending through a screw threaded stem 20 above the platform 14 and on which is engaged a packing nut 21, compressing a packing washer 22, against the stem 20. A plunger 24 is operable within the opening 18, the plunger being normally pressed upward by a coiled compression spring 25, the lower end of which abuts against a plate 26 secured to the flange 16 below this opening 18.

Extending laterally outward from opposite sides of the valve body 15 are elements 27 and 28, containing passages 30 which intersect the opening 18 in the body of the valve.

Connected to one of the projections 28 is an inlet pipe 31 leading from the source of supply, while connected with the other projection 27 is another pipe 32 leading into the tank 10.

Formed transversely through the plunger 24 is an opening 34 which may be brought into registration with the passages 30, so that fluid may pass directly therethrough or, when the plunger is in a lowered position, the passages are closed.

Formed at the upper part of the stem 23 is a rectangular head 35 containing a transverse recess 36, and in the bottom of the recess is a depression 37, the purpose of which will be farther on described. Erected upon the platform 14 is a standard 40, having a laterally extending projection 41, bored to receive a spindle 42, provided with a knob or actuating head 43, the spindle passing downward through an appropriate opening in the platform 14, and having engaged at its lower end a float 44.

Upon the casing 11 is secured a sleeve 45, having a set screw 46, adapted to be manually operated whereby the spindle or rod 42 may be locked in any desired position.

Rigidly attached to the spindle 42, is an arm 48, carrying in its outer end a pin 49, engageable in a slot 50, formed in the inner end of a lever 51, pivoted on a pin 52, set in the upper end of a standard 53 secured on the platform 14. The opposite or outer end 54, of the lever 51, is pivotally engaged with a link 55, the opposite end of which is pivotally engaged with another lever 56, pivoted on the pin 57, set in the standard 40. The lever 56 passes through a slot 59 in the standard 53 and the transverse recess 36, of the plunger head and is formed with an angular lug 58, engageable with the indentation 37 formed in the recess so as to operate therein.

Formed with the lever 56, is an angular lug 60 adapted to make contact with the extreme upper end of the slot 59, in the standard 53, thereby limiting the upward movement of the plunger, a similar lug 62 being formed on the lower side of the lever arm 54 adapted to make direct contact with the inner side of the standard near its top.

In operation, the parts having been assembled in the manner indicated, and the tank in an empty condition, obviously the float 44 extending therewithin, due to its weight and attached parts, increased by the operation of the spring 25, causes the float to assume its lowermost position, as indicated in Fig. 1, at which time the stop 62 will be in contact with the upright 53.

When the liquid has risen in the tank so as to elevate the float 44, moving the spindle 42 so as to actuate the lever connections, the plunger 24 is lowered, closing the passage through the openings 30 preventing further filling of the tank and compressing the spring 25.

Should it be desired to fill the tank in excess of the amount normally required, the knob 43 may be depressed, causing the opening 34 in the plunger to register with the openings 30, and permitting water to further enter into the tank.

Due to the leverage of the several operative connections it will be evident that the action of the plunger is positive and rapid, forming an effective device for the purpose indicated and which is extremely sensitive to the rise or fall of liquids within the tank.

Having thus described my invention, what I claim as new and desire to secure by Letters Patent, is—

1. In a control valve, the combination with a bored cylindrical body, having registering inlet and outlet openings passing therethrough, a plunger movable in said body adapted to control the openings, spring actuated means for normally holding said plunger in a raised position, a tank to receive the flow from said outlet, a vertically movable spindle, a float in said tank engaged with the lower end of said spindle, an arm attached to said spindle, a lever engaged therewith, a second lever engaged on the support for said spindle, a head on said plunger in which the second lever engages, and link connections between said levers whereby they are adapted to operate in unison.

2. In a control valve, the combination with a body having inlet and outlet openings, a central bored passage in which said inlet and outlet openings register, a plunger movable in said bore, means for normally holding said plunger in a raised position, a head formed on said plunger, said head having a recess, a pair of uprights engaged at the top of said body, a lever pivoted on one of said uprights passing through the mentioned recess, and through the other of said uprights, a tank adapted to receive the discharge from said valve, a float operable therein, a spindle to which said float is connected, means formed with one of said standards for guiding said spindle, a rigid arm on said spindle, a second lever engaged therewith, said second lever being pivoted in the other of said uprights, links between said levers, and means for manually depressing said spindle whereby the flow of liquid may be controlled.

In testimony whereof I have affixed my signature.

PETER MOJICO.